(12) United States Patent
Nishida

(10) Patent No.: US 7,676,089 B2
(45) Date of Patent: Mar. 9, 2010

(54) DOCUMENT LAYOUT ANALYSIS WITH CONTROL OF NON-CHARACTER AREA

(75) Inventor: Hirobumi Nishida, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1046 days.

(21) Appl. No.: 11/362,755

(22) Filed: Feb. 28, 2006

(65) Prior Publication Data

US 2006/0204095 A1 Sep. 14, 2006

(30) Foreign Application Priority Data

Mar. 8, 2005 (JP) ............................. 2005-064513

(51) Int. Cl.
*G06K 9/34* (2006.01)
(52) U.S. Cl. .................. 382/176; 382/177; 382/180
(58) Field of Classification Search ................ 382/176, 382/177, 180
See application file for complete search history.

(56) References Cited

U.S. PATENT DOCUMENTS

| 5,202,933 | A | * | 4/1993 | Bloomberg ................. 382/176 |
| 5,430,808 | A | * | 7/1995 | Baird et al. ................. 382/176 |
| 5,613,016 | A | | 3/1997 | Saitoh |
| 5,647,021 | A | | 7/1997 | Baird et al. |
| 5,995,659 | A | * | 11/1999 | Chakraborty et al. ....... 382/176 |
| 6,785,420 | B2 | | 8/2004 | Yamaai |

| 2001/0024520 | A1 | 9/2001 | Yamaai |

FOREIGN PATENT DOCUMENTS

| EP | 0 461 817 A2 | 12/1991 |
| EP | 0 621 552 A2 | 10/1994 |
| JP | 11-203305 | 7/1999 |
| JP | 11-250041 | 9/1999 |
| JP | 2000-67158 | 3/2000 |
| JP | 2000-113103 | 4/2000 |
| JP | 2002-236921 | 8/2002 |

OTHER PUBLICATIONS

H. S. Baird, "Background Structure in Document Images" In H. Bunke, P.S.P. Wang, and H.S. Baird, Eds., Document Image Analysis, World Scientific, Singapore, pp. 17-34, 1994.

(Continued)

*Primary Examiner*—Vikkram Bali
*Assistant Examiner*—Eueng-Nan Yeh
(74) *Attorney, Agent, or Firm*—Dickstein Shapiro LLP

(57) ABSTRACT

An apparatus, method, system, computer program and product, each capable of applying document layout analysis to a document image with control of a non-character area. A non-character area is extracted from a document image to be processed. A character image is generated from the document image by removing the non-character area from the document image. The character image is segmented into a plurality of sections to generate a segmented image. The segmented image is adjusted using a selected component of the non-character image to generate an adjusted segmented image. A segmentation result is output, which is generated based on the adjusted segmented image.

12 Claims, 11 Drawing Sheets

OTHER PUBLICATIONS

T.M. Breuel, "Two Geometric Algorithms for Layout Analysis" In Proceedings of IAPR Workshop on Document Analysis Systems, Princeton, NJ, USA 2002, pp. 1-12.

Extended European Search Report for EP Application No. 06251116.7, dated Aug. 19, 2009.

B. Yu, et al., "A Generic System for Form Dropout," *IEEE Transactions on Pattern Analysis and Machine Intelligence*, vol. 18, No. 11, Nov. 1996.

H.S. Baired, et al.,: "Image Segmentation by Shape-Directed Covers," *Proceedings of the International Conference on Pattern Recognition*. Atlantic City, Jun. 16-21, 1990. vol. i, Jun. 16, 1990, Baird.

\* cited by examiner

| AAAA<br>AAAA | BBB<br>BBB | CCCC<br>CC | DDD<br>DDDD |
|---|---|---|---|
| EE | FF<br>FF | G<br>G G | HHH<br>H H |
| II | J | KK | LLL |

| | | | |
|---|---|---|---|
| | | | |
| | | | |
| | | | |

| AAAA | BBB | CCCC | DDD |
|---|---|---|---|
| AAAA | BBB | CC | DDDD |
| EE | FF | G | HHH |
| | FF | G G | H H |
| II | J | KK | LLL |

DOCUMENT LAYOUT ANALYSIS WITH CONTROL OF NON-CHARACTER AREA

This patent application is based on and claims priority to Japanese patent application No. 2005-064513 filed on Mar. 8, 2005, in the Japanese Patent Office, the entire contents of which are hereby incorporated by reference.

FIELD OF THE INVENTION

The following disclosure relates generally to an apparatus, system, method, and computer program and product, each capable of applying document layout analysis to a document image with control of a non-character area of the document image.

DESCRIPTION OF THE RELATED ART

To convert a document image into an electronic form, document layout analysis is often applied. The document layout analysis segments the document image into different kinds of components, such as characters, columns, figures, pictures, rule lines, tables, etc. While a wide variety of other methods and algorithms exist, background analysis methods have attractive properties. For example, they are applicable to a wide variety of languages and layout structures, while having robustness to noise in the document image.

In the background analysis methods, rectangles ("white rectangles") covering white pixels, i.e., covering no black pixels, are extracted as a background area. For example, the white rectangles may be extracted from a document image in an order that maximizes the rectangle areas until a certain stopping rule applies. Using these white rectangles as a separator, the document image is segmented into different kinds of components. However, these background analysis methods may suffer from some disadvantages. For example, the background area may not be extracted with high accuracy when the document image includes a non-character area having pictures, figures, rule lines, tables, etc.

BRIEF SUMMARY OF THE INVENTION

In view of the above-described and other problems, example embodiments of the present invention provide an apparatus, method, system, computer program and product, each capable of applying document layout analysis to a document image with control of a non-character area of the document image.

In one example, a non-character area is extracted from a document image to be processed. A character image is generated from the document image by removing the non-character area from the document image. The character image is segmented into a plurality of sections to generate a segmented image. The segmented image is adjusted using a selected component of the non-character image to generate an adjusted segmented image. A segmentation result is output, which is generated based on the adjusted segmented image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is an illustration of a portion of an example document image to be processed by the image processing apparatus of FIG. 1;

FIG. 10 is an illustration of a non-character area extracted from the example portion of FIG. 9;

FIG. 11 is an illustration of an example character image generated from the example portion of FIG. 9;

DETAILED DESCRIPTION OF THE INVENTION

Figure 1:
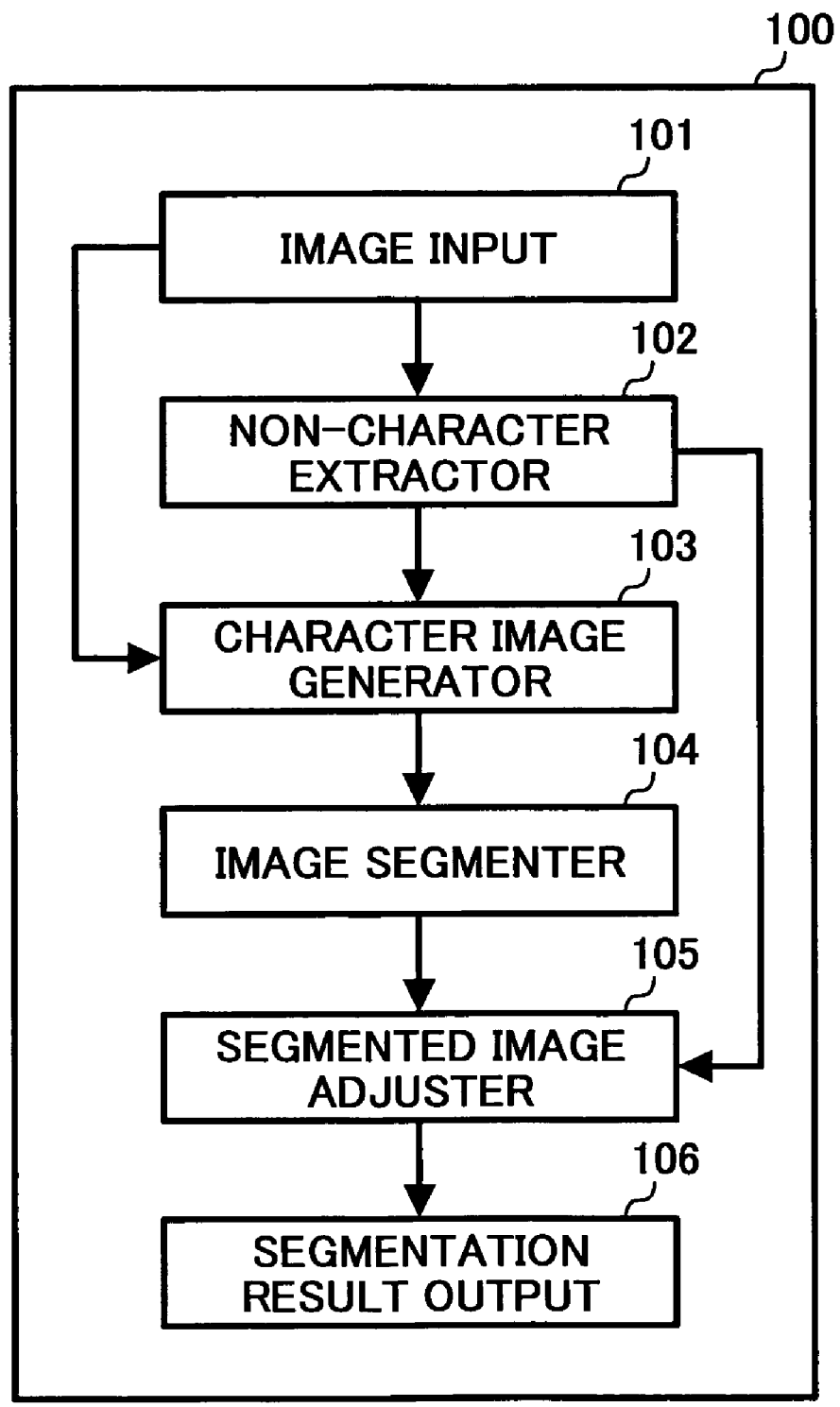
FIG. 1 is a schematic block diagram illustrating the functional structure of an image processing apparatus according to an example embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 100 according to an example embodiment of the present invention.

The image processing apparatus 100 is capable of outputting a segmentation result of a document image, which may be used in document layout analysis. As shown in FIG. 1, the image processing apparatus 100 includes an image input 101, a non-character extractor 102, a character image generator 103, an image segmenter 104, a segmented image adjuster 105, and a segmentation result output 106.

The image input 101 inputs a document image to be processed. In one example, the image input 101 may receive a binary document image. In another example, the image input

101 may receive a multivalue document image. Further, any preprocessing, such as skew correction, may be previously applied to the document image. When the multivalue document image is input, the multivalue document image may be converted into a binary document image. The reference line from block 101 to 103 represents the flow of the document image input to the image input 101 to the character image generator 103.

The non-character extractor 102 extracts a non-character area from the document image, which is input by the image input 101. As described above, the document image may be received in the form of binary or multivalue. Further, in this example, the non-character area corresponds to an area having a picture, figure, line, etc. The reference line from block 102 to 103 represents the flow of the non-character area data extracted by the non-character extractor 102. The reference line from block 102 to 105 represents the flow of the non-character area data extracted by the non-character extractor 102.

The character image generator 103 removes the non-character area from the document image to generate a character image. The document image may be received in the form of binary or multivalue, as described above. However, when the multivalue document image is input to the character image generator 103, the multivalue document image is preferably converted to a binary image before or after removing the non-character area. Accordingly, the character image is output in the form of binary.

The image segmenter 104 segments the character image into a plurality of sections to generate a segmented image. As described above, the character image is output as a binary image having a plurality of black pixels and a plurality of white pixels. The image segmenter 104 may apply any kind of background analysis method to the binary character image to generate the segmented image. For example, the image segmenter 104 forms one or more maximal white rectangles, which cover the plurality of white pixels, i.e., overlap none of the plurality of black pixels, of the character image. Using the white rectangles as a separator, the image segmenter 104 segments the character image into the plurality of sections.

The segmented image adjuster 105 adjusts the segmented image using a selected component of the non-character area to generate an adjusted segmented image. In this example, the segmented image adjuster 105 adjusts the segmented image using the line of the non-character area. The line of the non-character area may include a rule line, table line, border line, etc., which may function as a separator for segmenting the character image.

The segmentation result output 106 outputs a segmentation result, which is generated based on the adjusted segmented image. For example, the segmentation result output 106 may extract a run of continuous black pixels from the adjusted segmented image, and output the extracted run as the segmentation result. In another example, the segmentation result output 106 may extract a run of continuous white pixels from the adjusted segmented image, and output the extracted run as the segmentation result.

Figure 2:
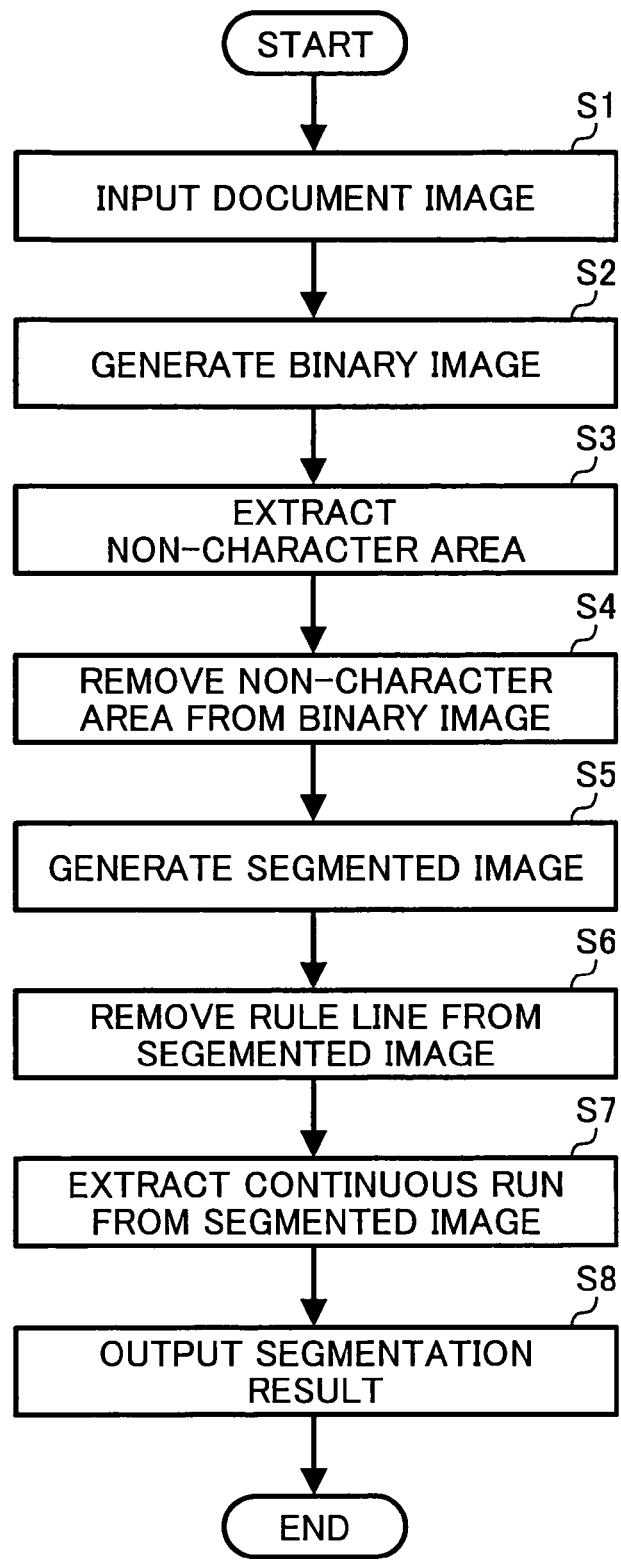
FIG. 2 is a flowchart illustrating operation of outputting a segmentation result, performed by the image processing apparatus of FIG. 1, according to an example embodiment of the present invention.

Referring now to FIG. 2, operation of outputting a segmentation result, performed by the image processing apparatus 100 of FIG. 1, is explained according to an example embodiment of the present invention.

Step S1 inputs a document image to be processed. In this example, a multivalue document image is input as the document image.

Figure 3:
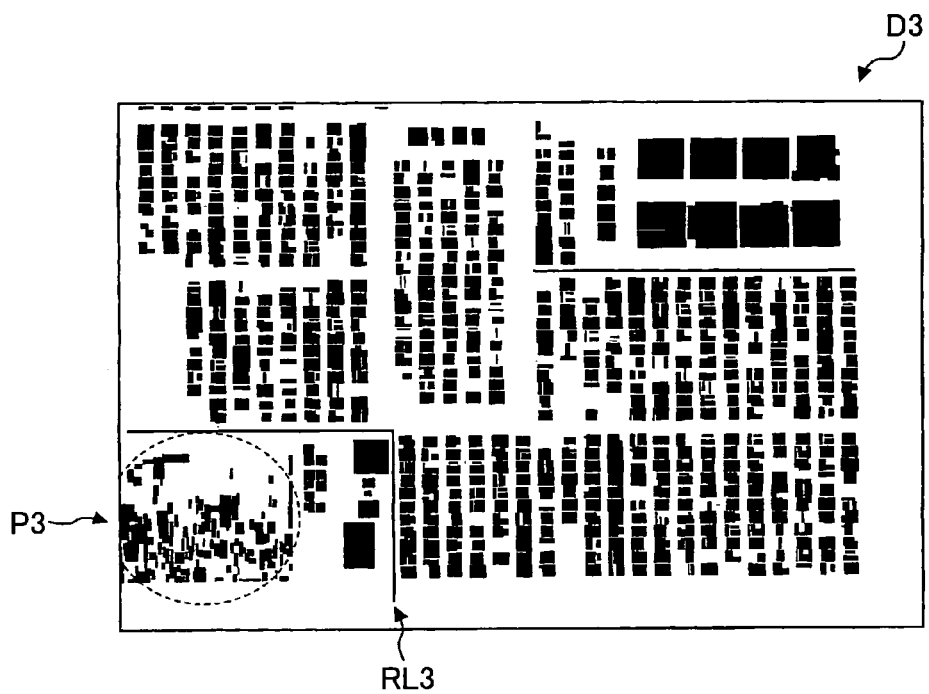
FIG. 3 is an illustration of an example document image to be processed by the image processing apparatus of FIG. 1.

Step S2 generates a binary document image by applying any kind of binarization method to the multivalue document image. For example, a binary document image D3 shown in FIG. 3 may be generated. As shown in FIG. 3, the binary document image D3 includes different kinds of components, such as a plurality of characters (indicated by a plurality of small black rectangles), a picture P3, a plurality of lines such as a rule line RL3, etc.

Step S3 extracts a non-character area from the binary document image using any kind of character recognition method, for example, as described in the U.S. Pat. No. 5,613,016, patented on Mar. 18, 1997, the entire contents of which are hereby incorporated by reference. In this example, the non-character extractor 102 extracts a non-character area having the picture P3, and the plurality of lines including the rule line RL3, from the binary document image D3 shown in FIG. 3.

Step S4 removes the non-character area from the binary document image to generate a character image having a character area. Step S4 is preferably performed to suppress possible adverse influence of the non-character area on the segmentation result.

Figure 4:
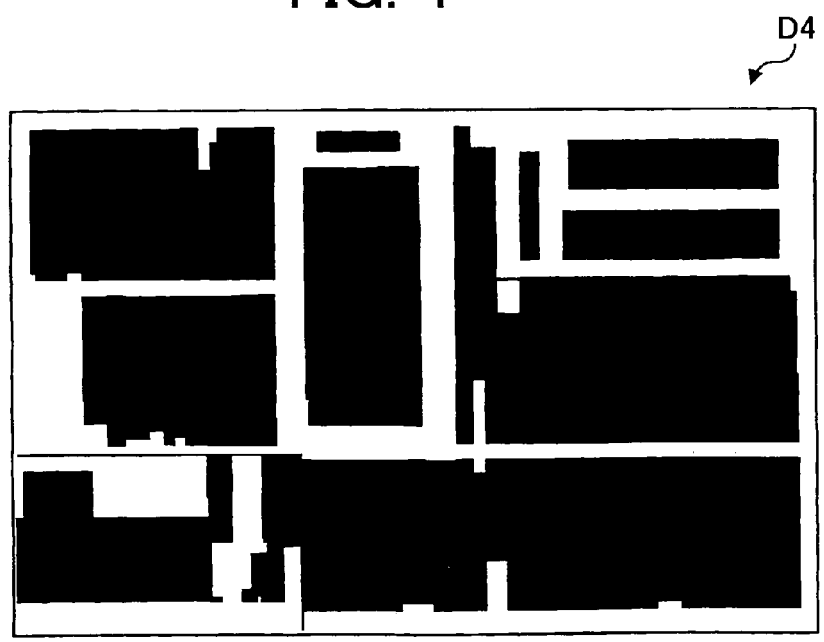
FIG. 4 is an illustration of an example segmented image generated from the document image of FIG. 3 using a known method.

For example, if image segmentation is applied to the binary document image D3, a segmented image D4 shown in FIG. 4 may be generated. Referring to FIG. 4, the non-character area such as the picture P3 or the rule line RL3 is not separated from the character area having the pluratliy of characters. Accordingly, the segmented image D4 of FIG. 4 may not be able to provide an accurate segmentation result.

Figure 5:
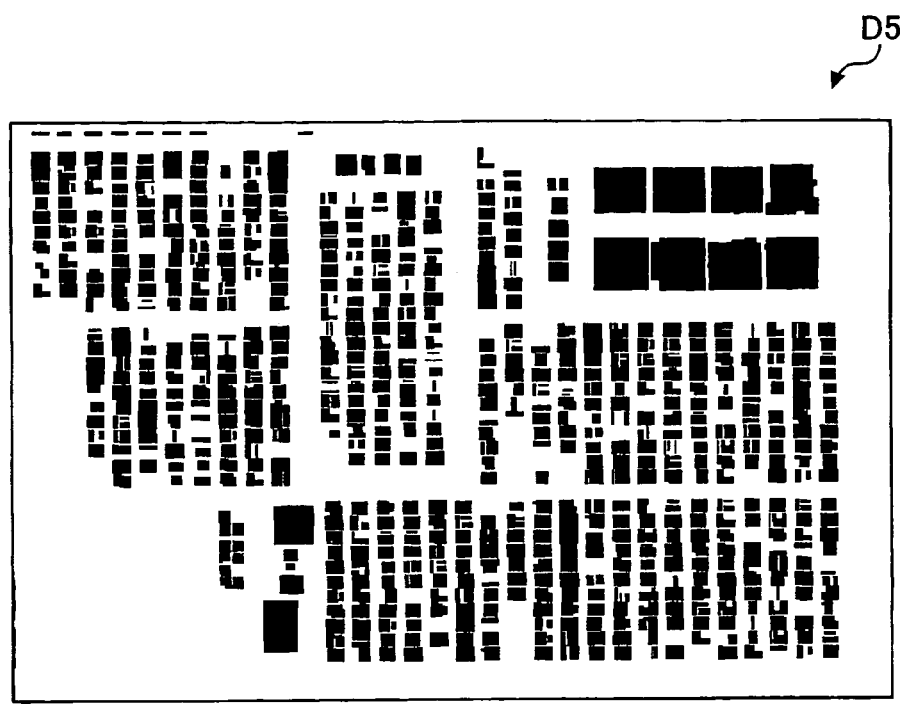
FIG. 5 is an illustration of an example character image generated from the document image of FIG. 3.

To suppress the adverse influence of the non-character area, the character image generator 103 generates a character image D5 of FIG. 5 by removing the non-character area from the binary document image D3 of FIG. 3. Referring to the character image D5 of FIG. 5, the picture P3 and the plurality of lines including the rule line RL3 are removed as compared with the document image D3 of FIG. 3.

Figure 6:
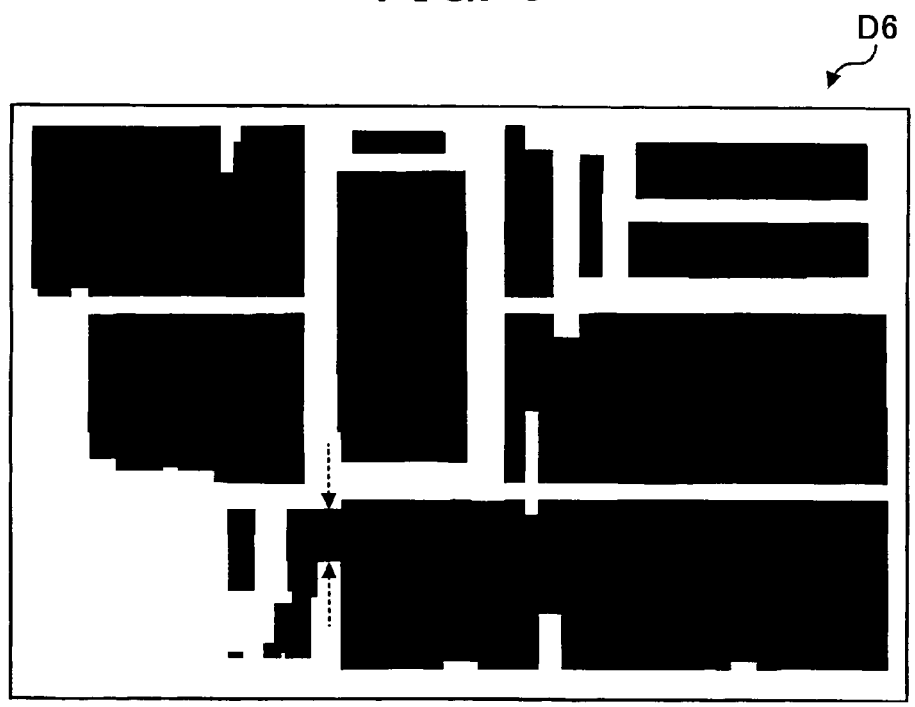
FIG. 6 is an illustration of an example segmented image generated from the example character image of FIG. 5.

Referring back to FIG. 2, Step S5 segments the character image into a plurality of sections to generate a segmented image, using any kind of background analysis method. In this example, a segmented image D6 shown in FIG. 6 is generated from the character image D5 of FIG. 5 by applying the background analysis method described in the U.S. patent application Ser. No. 11/201,366, filed on Aug. 11, 2005, the entire contents of which are hereby incorporated by reference. Referring to FIG. 6, the segmented image D6 still has an area in which different components are incorrectly merged into one component, such as the area indicated by an arrow shown in FIG. 6. To address this problem, the segmented image may be further adjusted using a selected component of the non-character area. More specifically, the example problem shown in FIG. 6 may be solved using the rule line RL3 of FIG. 3, which may function as a separator of the merged component.

Figure 7:
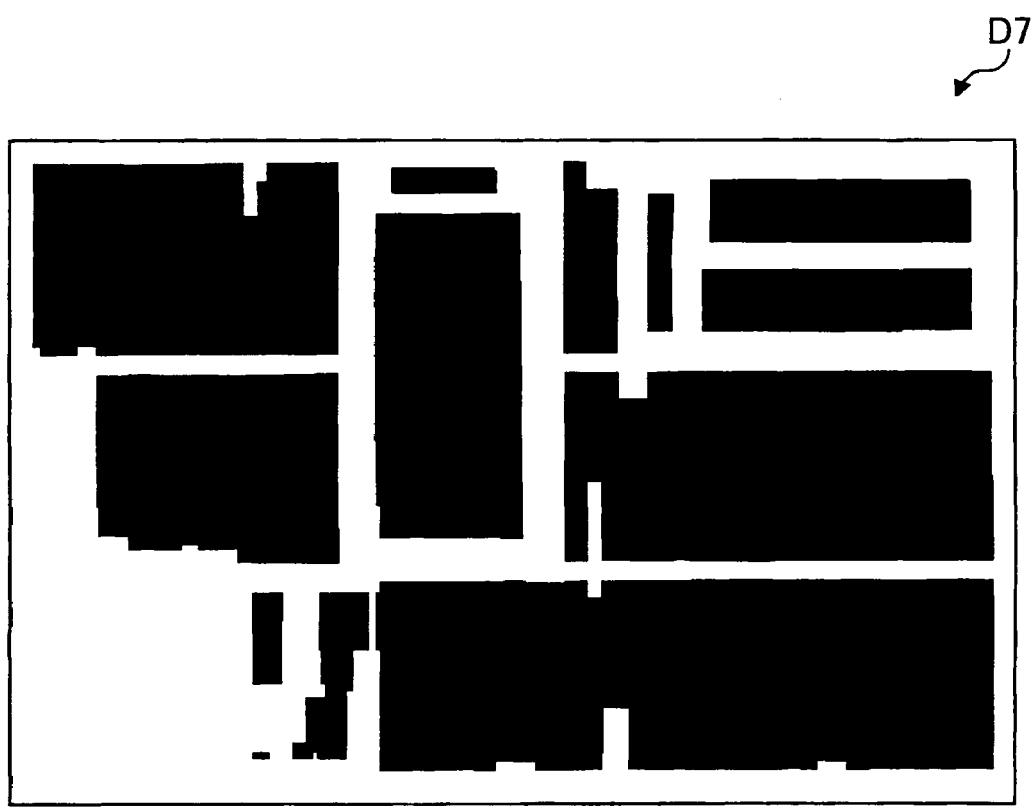
FIG. 7 is an illustration of an example adjusted segmented image generated by adjusting the example segmented image of FIG. 6.

Step S6 of FIG. 2 removes a selected component, such as a rule line, of the non-character image from the segmented image. In this example, the rule line RL3 of FIG. 3 is removed from the segmented image D6 of FIG. 6 to generate an adjusted segmented image D7 of FIG. 7. As shown in FIG. 7, the rule line RL3 functions as a separator for segmenting the merged component of FIG. 6 into different components. Further, in this example, removing the rule line RL3 may correspond to an operation of changing a pixel value of the portion originally having the rule line RL3, or any other operation of using information obtainable from the rule line RL3.

Referring back to FIG. 2, Step S7 extracts a run of continuous pixels of the same type from the adjusted segmented image.

Step S8 outputs the extracted run as a segmentation result of the document image, and the operation ends.

The operation of FIG. 2 may be performed in various other ways. For example, Step S2 of generating a binary image may be performed after Step S3 of extracting a non-character area. In such a case, the multivalue document image is binarized into the binary document image, after the non-character area is extracted. Further, the white rectangles may not be rectangles in shape.

Figure 8:
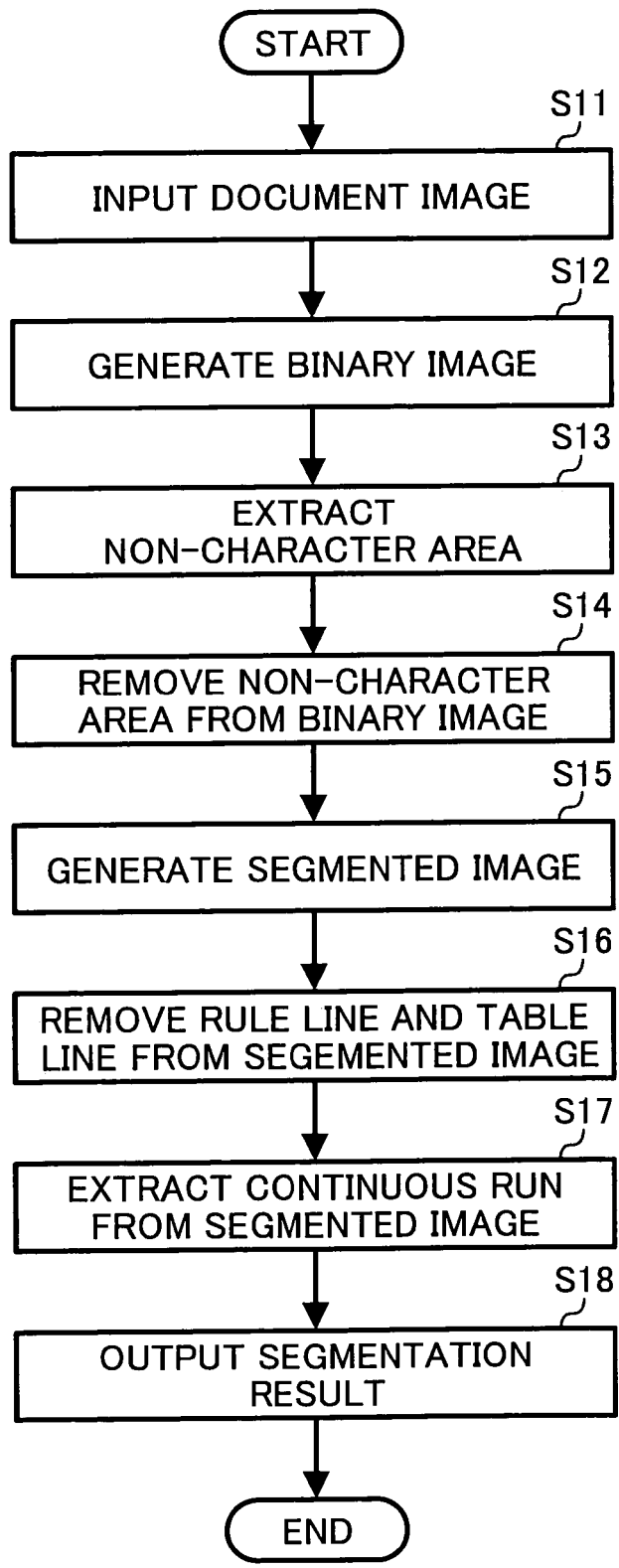
FIG. 8 is a flowchart illustrating operation of outputting a segmentation result, performed by the image processing apparatus of FIG. 1, according to an example embodiment of the present invention.

Referring now to FIG. 8, operation of outputting a segmentation result, performed by the image processing apparatus 100 of FIG. 1, is explained according to an example embodiment of the present invention.

Step S11 inputs a document image to be processed. In this example, a multivalue document image is input as the document image.

Step S12 generates a binary document image by applying any kind of binarization method to the multivalue document image. For example, a binary document image substantially similar to the binary document image D3 of FIG. 3 may be generated. However, the binary document image of this example additionally includes a table T9 shown in FIG. 9.

Step S13 extracts a non-character area from the binary document image using any kind of character recognition method, for example, as described in the U.S. Pat. No. 5,613,016, patented on Mar. 18, 1997 or the U.S. Pat. No. 6,785,420, patented on Aug. 31, 2004, the entire contents of which are hereby incorporated by reference. In this example, the non-character extractor 102 extracts a non-character area having the picture P3 and the plurality of lines from the binary document image. As described above, in this example, the plurality of lines includes the rule line RL3, and a table line TL10, shown in FIG. 10, of the table T9.

Step S14 removes the non-character area from the binary document image to generate a character image having a character area. As described above referring to Step S4 of FIG. 2, step S14 is preferably performed to suppress possible adverse influence of the non-character area on the segmentation result. In this example, the non-character area including the picture P3, and the plurality of lines including the rule line RL3 and the table line TL10, is removed from the binary document image. Accordingly, a character image substantially similar to the character image D5 of FIG. 5 is generated. However, the character image of this example additionally includes a plurality of characters TC11, shown in FIG. 11, in a portion corresponding to the portion having the table T9 of the binary document image.

Figure 12:
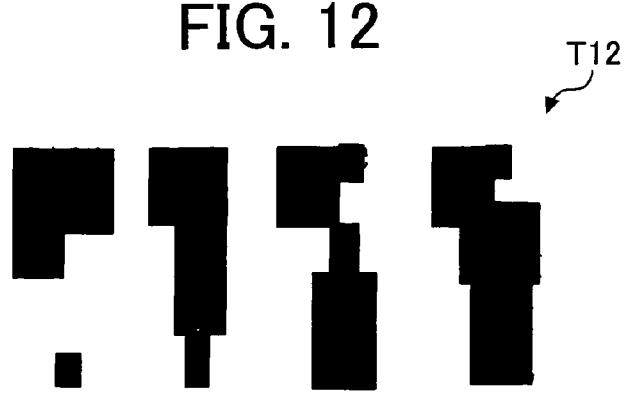
FIG. 12 is an illustration of an example segmented image generated from the example character image of FIG. 11.
Figure 13:
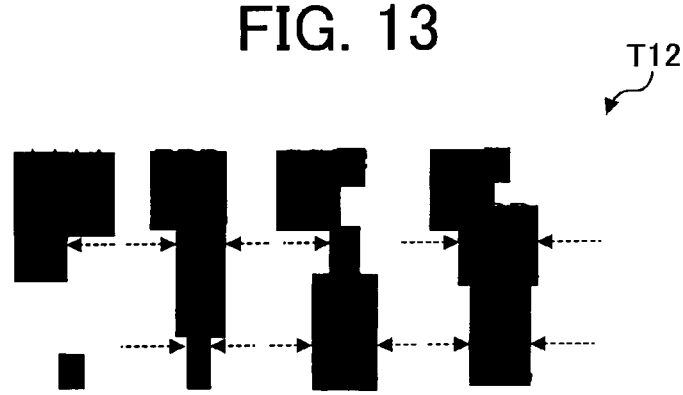
FIG. 13 is an illustration for explaining a merged component of the example segmented image of FIG. 12.

Referring back to FIG. 8, Step S15 segments the character image into a plurality of sections to generate a segmented image, using any kind of background analysis method. In this example, a segmented image substantially similar to the segmented image D6 of FIG. 6 is generated by applying the background analysis method described in the U.S. patent application Ser. No. 11/201,366, filed on Aug. 11, 2005, the entire contents of which are hereby incorporated by reference. The segmented image of this example additionally includes a portion T12 shown in FIG. 12, which corresponds to the portion TC11 shown in FIG. 11. As described above referring to FIG. 6, the segmented image of this example still has an area in which different components are incorrectly merged into one component, such as the area indicated by the arrow shown in FIG. 6. Further, in this example, the area having the merged component includes an area indicated by an arrow shown in FIG. 13, which corresponds to the portion T12 of FIG. 12. To address this problem, the segmented image including the portion T12 may be further adjusted using a selected component of the non-character area. More specifically, the example problem shown in FIG. 6 may be solved using the rule line RL3 of FIG. 3 as described above referring to FIG. 2. Further, the example problem shown in FIG. 13 may be solved using the table line TL10 of FIG. 10, which may function as a separator of the merged component.

Figure 14:
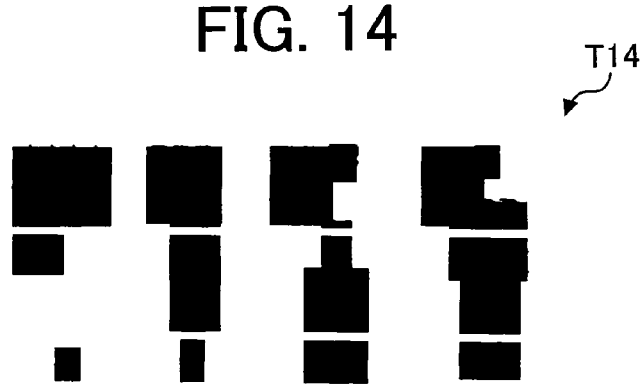
FIG. 14 is an illustration of an example adjusted segmented image generated by adjusting the example segmented image of FIG. 12.

Step S16 of FIG. 8 removes a selected component, such as a rule line or a table line, of the non-character image from the segmented image. In this example, the rule line RL3 of FIG. 3, and the table line TL10 of FIG. 10, are removed respectively from the segmented image to generate an adjusted segmented image. The adjusted segmented image is substantially similar to the adjusted segmented image D7 of FIG. 7. The adjusted segmented image of this example additionally includes a portion T14, shown in FIG. 14, which corresponds to the portion T12 shown in FIG. 12 or 13. As shown in FIG. 14, the table line TL10 functions as a separator for segmenting the merged component of FIG. 13 into different components. Further, in this example, removing the rule line RL3 or the table line TL10 may correspond to an operation of changing a pixel value of the portion originally having the rule line RL3 or the table line TL10, or any other operation of using information obtainable from the rule line RL3 or the table line TL10.

Referring back to FIG. 8, Step S17 extracts a run of continuous pixels of the same type from the adjusted segmented image.

Step S18 outputs the extracted run as a segmentation result of the document image, and the operation ends.

The operation of FIG. 8 may be performed in various other ways. For example, Step S12 of generating a binary image may be performed after Step S13 of extracting a non-character area. In such a case, the multivalue document image is binarized into a binary document image, after the non-character area is extracted. Further, the white rectangles may not be rectangles in shape.

Figure 15:
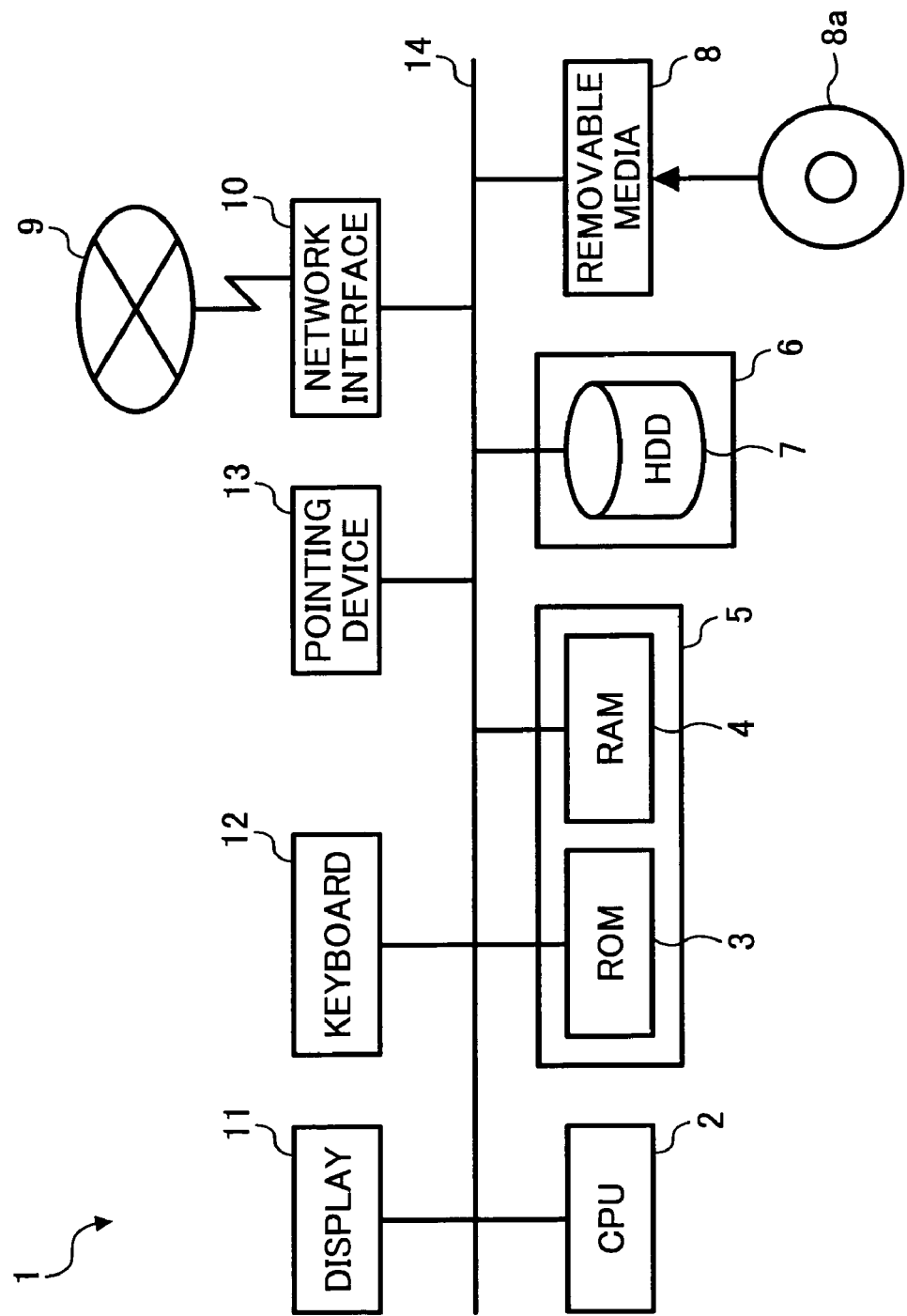
FIG. 15 is a schematic block diagram illustrating the structure of an image processing system according to an example embodiment of the present invention.

The image processing apparatus 100 of FIG. 1 may be implemented in various ways, for example, as an image processing system 1 illustrated in FIG. 15. The image processing system 1 may be a personal computer, personal digital assistant (PDA) device, palmtop computer, cellular phone, personal handy system (PHS), for example.

The image processing system 1 includes a central processing unit (CPU) 2, a first storage device 5 including a read only memory (ROM) 3 and a random access memory (RAM) 4, a second storage device 6 including a hard disk drive (HDD) 7, a removable media apparatus 8, a network interface 10, a display device 11, a keyboard 12, and a pointing device 13, which are connected to one another via a bus 14.

The CPU 2 includes any kind of processor capable of controlling entire operation of the image processing system 1. The first storage device 5 stores various data in the ROM 3 or the RAM 4. The second storage device 6 stores various data including a document image to be processed, any kind of operating system (OS) such as Windows or Unix, or application programs to be operated by the CPU 2 such as an image processing program of the present invention.

The removable media apparatus 8 is capable of reading or writing data from or onto a removable medium 8a. Examples of the removable medium 8a include, but not limited to, flexible disk, hard disk, optical discs, magneto-optical discs, magnetic tapes, involatile memory cards, ROM, etc.

The network interface 10 allows the image processing system 1 to communicate with other apparatuses or devices via a network 9, such as the Internet or a local area network (LAN).

The display device 11 includes any kind of device capable of displaying various data to a user, such as a cathode ray tube (CRT) or liquid crystal display (LCD). The display device 11 may display the segmentation result to the user.

The keyboard 12 allows the user to input various data such as a command. The pointing device 13, including a mouse, allows the user to select various data.

In an example operation, when the CPU 2 is activated by a user, the CPU 2 starts up a loading program stored in the ROM 3, and loads the OS program from the HDD 7 onto the RAM 4. At the same time, the CPU 2 loads the image processing program from the HDD 7. According to the image processing program, the CPU 2 may perform an operation of outputting a segmentation result of a document image in a substantially similar manner as described above referring to FIG. 2 or 8.

Instead of loading from the HDD 7, the image processing program may be installed from the removable medium 8a, or it may be downloaded from the network 9 via the network interface 10.

Figure 16:
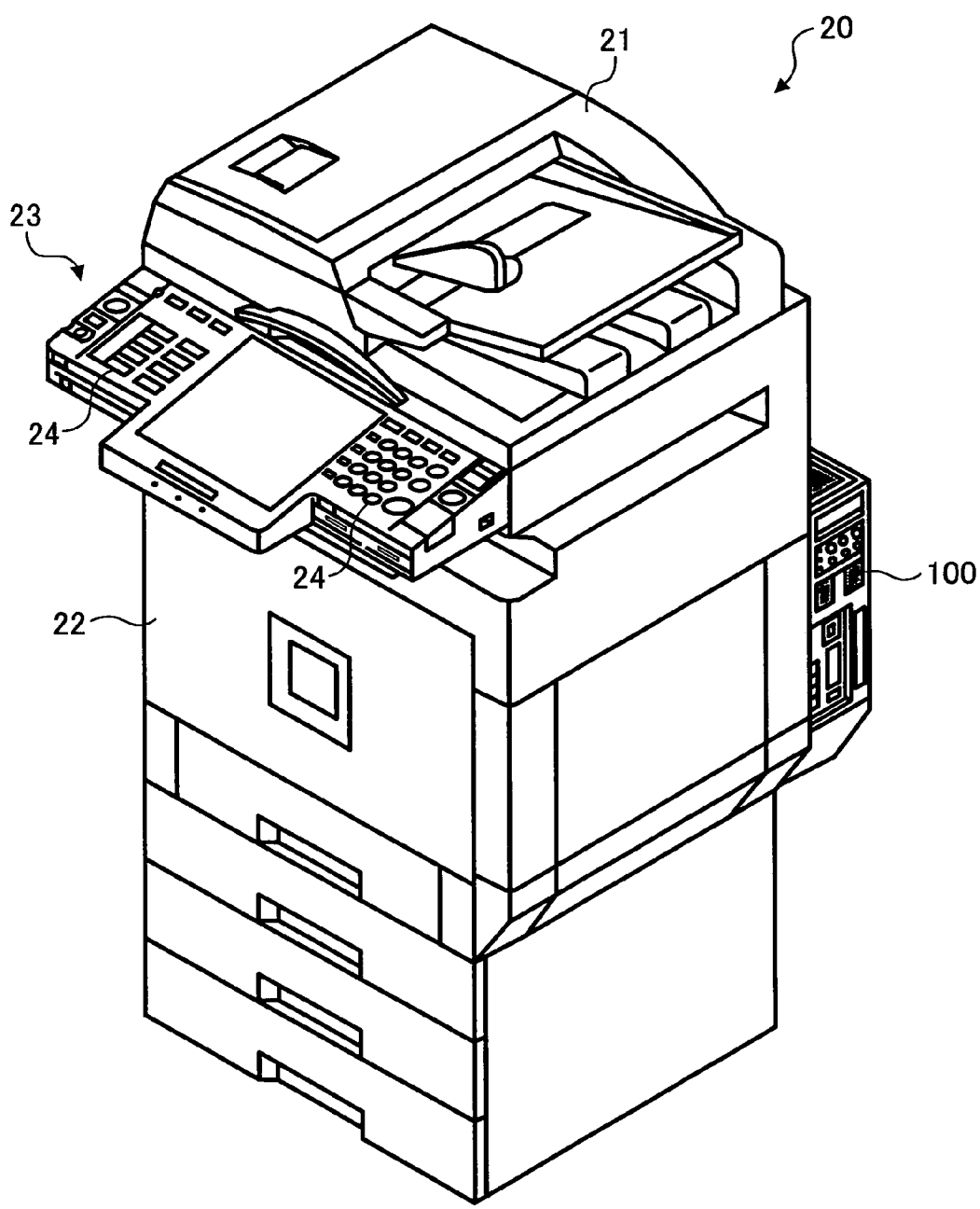
FIG. 16 is a perspective view illustrating the outer appearance of a multifunctional apparatus incorporating the image processing apparatus of FIG. 1, according to an example embodiment of the present invention.

Further, in this example, the image processing apparatus 100 of FIG. 1 may be used in combination with any other device or apparatus as illustrated in FIG. 16. The multifunctional apparatus (MFP) 20 shown in FIG. 16 mainly includes a scanner 21, a printer 22, and the image processing apparatus 100. Further, the MFP 20 is provided with an operational panel having a plurality of keys 24.

In an example operation, the scanner 21 scans an original document into a document image, and inputs the document image to the image processing apparatus 100. The image processing apparatus 100 may segment the document image, and output a segmentation result to the printer 22. The printer 22 may print out the segmentation result.

In another example operation, the scanner 21 scans an original document into a document image, and inputs the document image into the image processing apparatus 100. The image processing apparatus 100 segments the document image, and displays a segmentation result on the operational panel.

Figure 17:
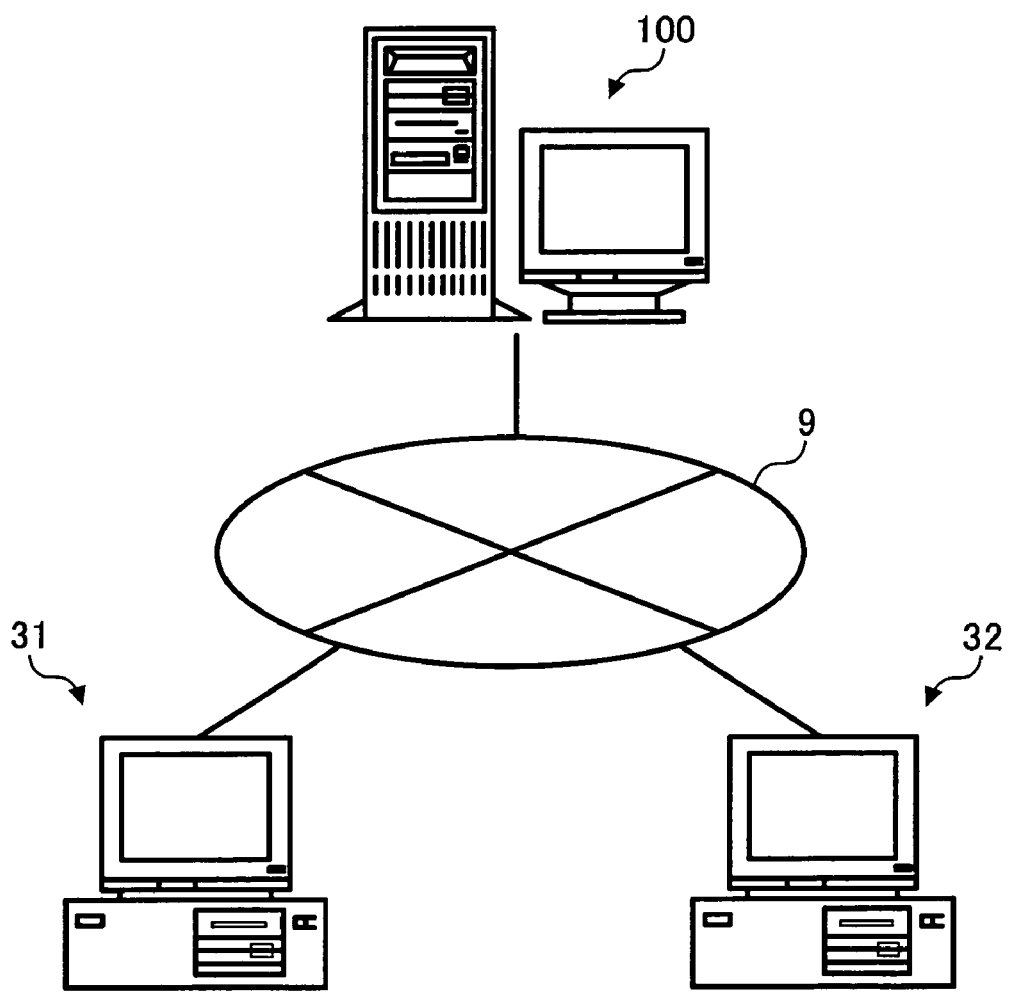
FIG. 17 is a schematic block diagram illustrating the structure of an image processing system according to an example embodiment of the present invention.

Further, the image processing apparatus 100 of FIG. 1 may function as a server in a server-client network system, for example, as illustrated in FIG. 17. The server-client network system of FIG. 17 includes the image processing apparatus 100 functioning as a server, and two image processing apparatuses 31 and 32 each functioning as a client, which are connected via the network 9. Each one of the image processing apparatuses 100, 31 and 32 can have the structure shown in FIG. 15.

In an example operation, the image processing apparatus 31 sends a document image to the image processing apparatus 100. The image processing apparatus 100 provides a segmentation result to the image processing apparatus 31.

In another example operation, the image processing apparatus 100 may upload the image processing program of the present invention to any one of the image processing apparatuses 31 and 32 via the network 9. In this manner, any one of the image processing apparatuses 31 and 32 can function as the image processing apparatus 100.

Further, the functions performed by the image processing apparatus 100 may be shared by one or more image processing apparatuses present in the network 9.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, any one of the above-described and other methods of the present invention may be implemented by ASIC, pre- pared by interconnecting an appropriate network of conventional component circuits or by a combination thereof with one or more conventional general purpose microprocessors and/or signal processors programmed accordingly.

The invention claimed is:

1. An image processing apparatus, comprising:
   means for inputting a document image to be processed;
   means for extracting a non-character area from the document image, wherein the non-character area comprises a line;
   means for generating a character image by removing the non-character area from the document image;
   means for segmenting the character image into a plurality of sections to generate a segmented image;
   means for adjusting the segmented image using an area previously occupied by the previously removed line of the non-character area as a separator to separate a merged section of the plurality of sections of the segmented image into different sections to generate an adjusted segmented image in which the merged section is separated into the different sections; and
   means for outputting a segmentation result generated based on the adjusted segmented image.

2. The apparatus of claim 1, wherein the character image is a binary image comprising a plurality of white pixels and a plurality of black pixels.

3. The apparatus of claim 2, wherein the means for segmenting comprises:
   means for extracting one or more maximal white rectangles covering the plurality of white pixels,
   wherein the character image is segmented using the maximal white rectangles as a separator.

4. The apparatus of claim 1, wherein the line of the non-character area comprises a rule line.

5. The apparatus of claim 4, wherein the line of the non-character area further comprises a table line.

6. The apparatus of claim 1, wherein the line of the non-character area comprises a table line.

7. An image processing method, comprising the steps of:
   inputting a multivalue document image to be processed;
   generating a binary document image from the multivalue document image;
   extracting a non-character area from the binary document image, wherein the non-character area comprises a line;
   removing the non-character area from the binary document image to generate a character image;
   generating a segmented image by segmenting the character image into a plurality of sections;
   adjusting the segmented image using an area previously occupied by the previously removed line of the non-character area as a separator that separates a merged section of the plurality of sections of the segmented image into different sections to generate an adjusted segmented image in which the merged section is separated into the different sections, wherein the merged section originally included the line of the non-character area that was previously removed from the binary document image; and
   outputting a segmentation result generated based on the adjusted segmented image.

8. An image processing method, comprising the steps of:
   inputting a multivalue document image to be processed;
   extracting a non-character area from the multivalue document image, wherein the non-character area comprises a line;
   generating a binary document image from the multivalue document image;

removing the non-character area from the binary document image to generate a character image;

generating a segmented image by segmenting the character image into a plurality of sections;

adjusting the segmented image using an area previously occupied by the previously removed line of the non-character area as a separator that separates a merged section of the plurality of sections of the segmented image into different sections to generate an adjusted segmented image in which the merged section is separated into the different sections, wherein the merged section originally included the line of the non-character area that was previously removed from the binary document image; and outputting a segmentation result generated based on the adjusted segmented image.

9. An image processing system, comprising:

a processor; and a storage device configured to store a plurality of instructions which, when executed by the processor, causes the processor to perform at least one function of the plurality of functions, the plurality of functions comprising:

inputting a document image to be processed;

extracting a non-character area from the document image, wherein the non-character area comprises a selected component;

generating a character image by removing the non-character area from the document image;

segmenting the character image into a plurality of sections to generate a segmented image;

adjusting the segmented image using the area previously occupied by the selected component of the previously removed non-character area as a separator that separates a merged section of the plurality of sections of the segmented image into different sections to generate an adjusted segmented image in which the merged section is separated into the different sections, wherein the merged section originally included the selected component of the non-character area that was previously removed from the document image; and outputting a segmentation result generated based on the adjusted segmented image.

10. The system of claim 9, further comprising:

a scanner configured to scan an original document image into the document image to be processed.

11. The system of claim 10, further comprising:

an output device configured to output the segmentation result in a form visible to a user.

12. A computer readable medium storing computer instructions for performing an image processing method comprising the steps of:

inputting a document image to be processed;

extracting a non-character area from the document image, wherein the non-character area comprises a line;

generating a character image by removing the non-character area from the document image;

segmenting the character image into a plurality of sections to generate a segmented image;

adjusting the segmented image using the line of the non-character area that is previously removed from the document image as a separator that separates a merged section of the plurality of sections of the segmented image into different sections to generate an adjusted segmented image in which the merged section is separated into the different sections, wherein the merged section originally has the line of the non-character area that is previously removed from the document image; and outputting a segmentation result generated based on the adjusted segmented image.

* * * * *